United States Patent Office 3,539,564
Patented Nov. 10, 1970

3,539,564
2 - HETEROCYCLIC AND 2 - AMINO SUBSTITUTED - TETRAHYDRO - HALO-SULFAMYL-QUINAZOLINONES
Bola Vithal Shetty, Rochester, N.Y., assignor to Pennwalt Corporation, a corporation of Pennsylvania
No Drawing. Filed Feb. 23, 1968, Ser. No. 707,407
Int. Cl. C07d 51/48
U.S. Cl. 260—247.1                8 Claims

ABSTRACT OF THE DISCLOSURE

A 1,2,3,4-tetrahydro-7-halo (including 7-trifluoromethyl)-6-sulfamyl-4-quinazolinone substituted in the 2- position with an amino or a heterocyclic group, especially pyridyl, piperidino, pyrrolidino or morpholino; and in the 3- position with an aryl or aralkyl, especially phenyl, orthotolyl or benzyl. The compounds are useful as diuretics and saluretics.

---

The invention relates to 1,2,3,4-tetrahydro-6-sulfamyl-3-aryl or 3-aralkyl-4-quinazolinone compounds. More particularly it relates to 1,2,3,4-tetrahydro-7-halo or 7-haloalkyl-6-sulfamyl-3- aryl or aralkyl compounds having diuretic characteristics.

Compounds of the above general type are disclosed in my application Ser. No. 517,995, filed Jan. 3, 1966, now Pat. 3,360,518. The present compounds are improvements over these patented compounds.

In accordance with this invention 1,2,3,4-tetrahydro-7-halo or 7-haloalkyl-6-sulfamyl-3-aryl or aralkyl-4-quinazolinone compounds have in the 2- position an amino or a heterocyclic group, especially pyridyl, piperidino, pyrrolidino or morpholino.

The compounds of this invention are preferably of the following formula:

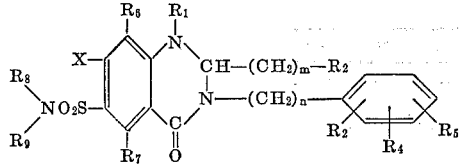

or the pharmaceutically acceptable salts thereof, wherein $R_2$ is a heterocyclic radical, especially one containing nitrogen (e.g., piperidino, pyridyl, pyrrolidino or morpholino); or $R_2$ is $NH_2$, $NHR_{10}$ where $R_{10}$ is loweralkyl, phenylloweralkyl or $R_2$ is

where $R_{11}$ is one of the radicals of $R_{10}$; or $R_2$ is

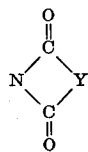

where Y is loweralkylene or o-phenylene unsubstituted or substituted with loweralkyl, loweralkoxy, halogen, amino or loweralkylamino such as

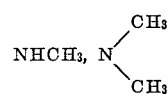

$R_1$ is hydrogen, loweralkyl, phenylloweralkyl which may be unsubstituted or substituted with loweralkoxy, loweralkyl or halogen;

X is halogen, loweralkoxy, halogen substituted loweralkyl, loweralkyl, $NO_2$, CN, thioloweralkyl, amino or loweralkylamino such as —NH loweralkyl or —N(loweralkyl)$_2$;

$R_6$ and $R_7$ are the same or different radicals of hydrogen, loweralkoxy, loweralkyl or halogen;

$R_8$ is hydrogen and $R_9$ is hydrogen, or $R_8$ is loweralkyl and $R_9$ is loweralkyl, or $R_8$ is loweralkyl or phenylloweralkyl and $R_9$ is hydrogen, or $R_8$ and $R_9$ are joined together to form a heterocyclic ring such as piperidino, morpholino or pyyrolidino;

$R_3$, $R_4$, and $R_5$ are any of the radicals (the same or different) hydrogen, loweralkyl, hydroxy, loweralkoxy, loweralkoxyloweralkyl, amino, loweralkylamino, sulfamyl halogen or trifluoromethyl;

$n$ is one of the integers 0–4, and
$m$ is one of the integers 0–6.

The terms "loweralkyl" "loweralkylene" and "loweralkoxy" mean alkyl, alkylene or alkoxy radicals containing 1–8 carbon atoms in a straight chain.

The compounds of this invention all have diuretic properties and may be effectively administered in the same manner and in dosage amounts the same as used for the analogous compounds of my application Ser. No. 517,995, filed Jan. 3, 1966. The varying compounds of this invention range in toxicity and effectiveness from that of quinethazone to that of hydrochlorothiazide.

The following are some suitable diuretic compounds coming under my general formula:
2-(N-piperidinomethyl)-3-(o-tolyl)-6-sulfamyl-7-chloro-1,2,3,4-tetrahydro-4-quinazolinone
2-(2-pyridylmethyl)-3-(o-tolyl)-6-sulfamyl-7-chloro-1,2,3,4-tetrahydro-4-quinazolinone
2-(N-morpholinomethyl)-3-(o-tolyl)-6-sulfamyl-7-chloro-1,2,3,4-tetrahydro-4-quinazolinone
2-(N-pyrrylmethyl)-3-(o-tolyl)-6-sulfamyl-7-chloro-1,2,3,4-tetrahydro-4-quinazolinone
2-(N-dimethylaminomethyl)-3-(o-tolyl)-6-sulfamyl-7-chloro-1,2,3,4-tetrahydro-4-quinazolinone
2-(N-benzylaminomethyl)-3-(o-tolyl)-6-sulfamyl-7-chloro-1,2,3,4-tetrahydro-4-quinazolinone
2-aminomethyl-3-(o-tolyl)-6-sulfamyl-7-chloro-1,2,3,4-tetrahydro-4-quinazolinone
2-phthalimidomethyl-3-(o-tolyl)-6-sulfamyl-7-chloro-1,2,3,4-tetrahydro-4-quinazolinone The following Table I gives additional compounds useful as diuretic agents:

TABLE I

Me=methyl
Ph=phenyl

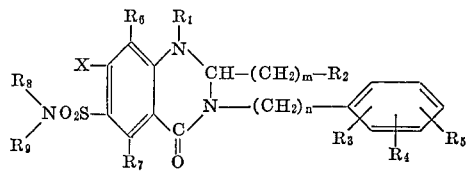

| R₁ | R₂ | R₃ | R₄ | R₅ | R₆ | R₇ | R₈ | R₉ | m | n | X | R₁₀ | R₁₁ |
|---|---|---|---|---|---|---|---|---|---|---|---|---|---|
| H | ⟨NMe piperidine⟩ | H | H | H | H | H | H | H | 0 | 1 | Cl | | |
| Me | ⟨N piperidine⟩ | 2-Me | 3-Me | H | OMe | Me | Me | Me | 1 | 2 | OMe | | |
| PhCH₂ | ⟨N pyridine⟩ | 2-Me | 3-Me | 4-Me | Me | H | Me | H | 2 | 3 | CH₂Cl | | |
| CH₂—C₆H₄—OMe | ⟨N pyrrolidine⟩ | 2-Me | H | H | Cl | H | PhCH₂ | H | 3 | 4 | CHCl₂ | | |
| CH₂—C₆H₄—Me | ⟨N—O morpholine⟩ | 2-Me | 3-NH₂ | H | Br | H | —(CH₂)₄— | | 5 | 0 | CF₃ | | |
| CH₂—C₆H₄—Cl | NH₂ | 2-Me | 3-OH | H | H | Me | —(CH₂)₅— | | 0 | 0 | Me | | |
| H | NHMe | 2-Me | 3-OMe | H | H | OMe | H | H | 4 | 0 | NO₂ | | |
| H | PhCH₂NH | 2-Me | 4-Cl | H | H | Cl | H | H | 6 | 0 | CN | | |
| H | N(R₁₀)(R₁₁) | 2-Me | H | H | H | Br | H | H | 0 | 0 | F | CH₃ | CH₃ |
| H | 2-Me | H | H | H | H | H | H | 0 | 0 | F | CH₃ | PhCH₂ |
| H | 2-Me | H | H | H | H | H | H | 0 | 0 | NH₂ | PhCH₂ | PhCH₂ |
| H | NH₂ | 2-Me | H | H | H | H | H | H | 0 | 0 | NHMe | | |
| H | NH₂ | 2-Me | H | H | H | H | H | H | 0 | 0 | NMe₂ | | |

| R₁ | R₂ | R₃ | R₄ | R₅ | R₆ | R₇ | R₈ | R₉ | m | n | X |
|---|---|---|---|---|---|---|---|---|---|---|---|
| H | 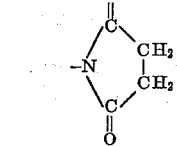 succinimide | H | H | H | H | H | H | H | 0 | 0 | Cl |
| H | 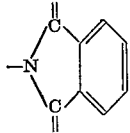 phthalimide | H | H | H | H | H | H | H | 0 | 0 | Cl |
| H | 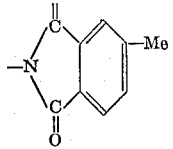 methylphthalimide | H | H | H | H | H | H | H | 0 | 0 | Cl |

| R₁ | R₂ | R₃ | R₄ | R₅ | R₆ | R₇ | R₈ | R₉ | m | n | X |
|---|---|---|---|---|---|---|---|---|---|---|---|
| H | phthalimido-OMe | H | H | H | H | H | H | H | 0 | 0 | Cl |
| H | phthalimido-Cl | H | H | H | H | H | H | H | 0 | 0 | Cl |
| H | phthalimido-NH₂ | H | H | H | H | H | H | H | 0 | 0 | Cl |
| H | phthalimido-NHMe | H | H | H | H | H | H | H | 0 | 0 | Cl |
| H | phthalimido-NMe₂ | H | H | H | H | H | H | H | 0 | 0 | Cl |

The following example illustrates the preparation of the compounds of this invention.

Preparation of 7-chloro-2-(N-piperidinomethyl)-6-sulfamyl-3-(o-tolyl)-1,2,3,4-tetrahydro-4-quinazolinone Synthetic route:

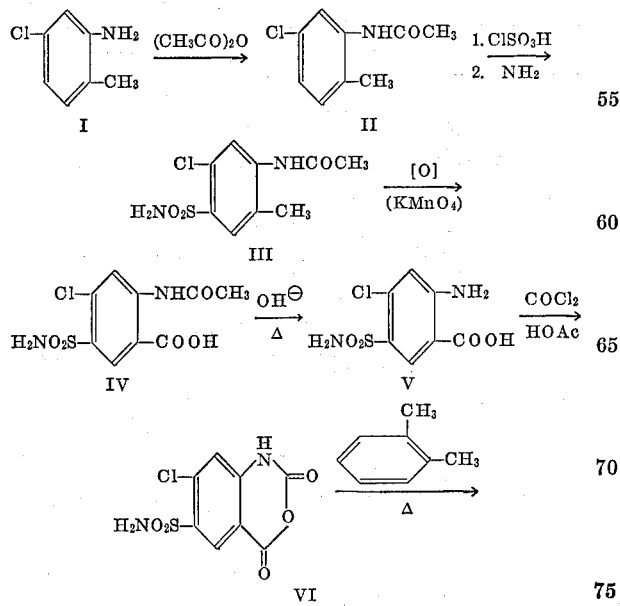

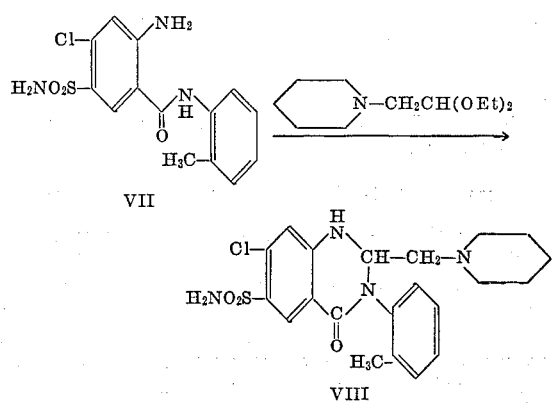

Preparation of 5-chloro-2-methylacetanilide, II 5-chloro-o-toluidine (I), (1000 gm.) was added to 9000 ml. of water, preheated to 35°, in a 4½ gallon battery jar. The slurry was vigorously stirred while 1260 gm. acetate anhydride was carefully added. Stirring was continued for four hours, then the product was filtered off and air dried. The crude product was recrystallized from 7500 ml. of benzene, using 40 gm. charcoal to remove some colored material. The product was air dried. It weighed 818 gm. and melted at 138–139°. This lot was combined with the material from lot numbers, 741–811, 741–859, 741–874, 745–612, 741–994, and 740–482. The total weight was 11 kg. from 10.4 kg. of starting material.

Preparation of 5-chloro-2-methyl-4-sulfamylacetanide, III

Chlorosulfonic acid (1000 gm.) was placed in a nitrogen flushed 5 liter, 3 neck round bottom flask fitted with a stirrer and a calcium chloride tube. 5-chloro-2-methyl-acetanilide (300 gm.) was cautiously added to the chlorosulfonic acid, and then 88 gm. sodium chloride was added portionwise over one hour. The reaction mixture was cautiously raised to 80° C. (foaming occurs). When the foaming had subsided, the temperature was raised to 92° C. and held there for three hours. The hot reaction mixture was added slowly with good agitation to 4000 ml. of acetone and 1500 gm. of ice. The resulting slurry was diluted with water to a total volume of 8000 ml. and the crude sulfonyl chloride was filtered off and washed with water. The damp filter cake was added to 3000 ml. of concentrated ammonium hydroxide, stirred at room temperature for one hour and then heated to 50° C. for two hours. The slurry was cooled, filtered, washed with water and air dried. The weight of product was 186 gm. It melted at 248–250°. This material was combined with that made in runs 741–863, 741–886, 747–505, 747–507, 747–903, and 745–647. The total weight of product was 4 kg. from 11 kg. starting material.

Preparation of N-acetyl-4-chloro-5-sulfamyl anthranilic acid, IV

Into a 12-liter flask was introduced 8000 ml. water, 1144 gm. magnesium sulfate heptahydrate and 400 gm. 5-chloro-2-methyl-4-sulfamylacetanilide. The mixture was heated to 80° and 710 gm. potassium permanganate was added portionwise with good stirring over about four hours at 80–85°. The mixture was kept at 80–85° for three hours after the permanganate addition was completed and then it was filtered hot. The manganese dioxide cake was washed with three 1000 ml. portions of water.

The filtrate was made acid with 200 ml. concentrated hydrochloric acid, filtered, washed with water and air dried. The crude product was combined with the crude product obtained from runs 743–858, 747–552, 742–237, 745–685, 747–529, and 740–245, giving a total weight of 2833 gm. This material was dissolved (under Lot #745–687) in 100 liters of 95% ethanol. The resulting solution was concentrated to a total volume of 10 liters, periodically filtering off the product that had crystallized out and washing this with 95% ethanol. The yield of purified product was 2500 gm. melting at 264–266°, from 3 kg. of starting material.

Preparation of 4-chloro-5-sulfamylanthranilic acid, V

N - acetyl - 4 - chloro - 5 - sulfamylanthranilic acid (2500 gm.) was refluxed for three hours in 15,000 ml. 3 N sodium hydroxide solution, then brought to a pH of four with concentrated hydrochloric acid. After allowing it to cool to about 70°, the product was filtered off and washed with water. The wet product was dissolved in 200 liters of boiling water, filtered hot and allowed to cool. When filtered, washed with water and air dried, the product weighed 2000 gm. and melted at 275–276°.

Preparation of 7-chloro-6-sulfamylisatoic anhydride, VI 4-chloro-5-sulfamylanthranilic acid (664 gm.) was slurried in 8000 ml. glacial acetic acid and 800 gm. liquid phosgene was added with good stirring. It was stirred vigorously for three hours at room temperature, filtered and washed with 1000 ml. acetic acid and 2000 ml. anhydrous ether. After drying in vacuo over phosphorous pentoxide, it weighed 698 gm. and melted at 290–292°. This material was combined with the lots obtained in runs 746–742 and 747–570. The total weight of product was 2214 gm. from 2000 gm. of starting material.

Preparation of 2-amino-4-chloro-5-sulfamyl-N-(o-tolyl)-benzamide, VII 7-chloro-6-sulfamylisatoic anhydride (720 gm.) was added to a 12 liter nitrogen flushed flask containing 4200 ml. o-toluidine and the mixture was stirred for ½ hour. It was then heated to 178° (solution occurred at 177°) and kept at about 175° for 10 minutes. It was allowed to cool to 60° by removing the heating mantle, then cooled rapidly to 25° with an ice bath. Ether (4200 gm.) was added, the mixture was stirred for a few minutes, filtered and washed thoroughly with ether. The crude product was slurried with 9000 ml. isopropanol, filtered, washed twice with 2000 ml. isopropanol, twice with 2500 ml. 8% aqueous ammonia, once with 2000 ml. water, twice with 1000 ml. isopropanol and finally three times with 2000 ml. ether. After air drying, the product weighed 560 gm. and melted at 287–289°. This partially purified amide was combined with the product obtained in runs 743–870 and 747–574 and the total (1573 gm.) was recrystallized (under Lot #743–871). The amide was dissolved in 3000 ml. dimethylformamide, filtered with celite and heated to 90°. To the resulting solution was added all at once, 1800 ml. 95° water. The suspension that resulted was allowed to cool with stirring over 20 hours, then filtered and washed with 1000 ml. 2:1 dimethylformamide:water, 2000 ml. methanol and 1500 ml. ether. After drying the product weighed 1458 gm. and melted at 289–292° with decomposition.

*Analysis.*—Calcd. for $C_{14}H_{14}Cl\ N_3O_3S$ (percent): C, 49.48; H, 4.15; N, 12.36; Cl, 10.43; S, 9.44. Found (percent): C, 49.66; H, 4.23; N, 12.41; Cl, 10.43; S, 9.55.

Preparation of 7-chloro - 2 - (N - piperidinomethyl)-6-sulfamyl-3-(o-tolyl)-1,2,3,4-tetrahydro-4-quinazolinone, VIII 2-amino-4-chloro-5-sulfamyl-N-(o-tolyl)-benzamide (8 gm.) was suspended in 50 ml. glacial acetic acid with 6 gm. N-piperidinoacetaldehyde diethylacetal. Sulfuric acid (2 ml.) was added dropwise and the mixture stirred overnight and filtered. The filtrate was concentrated to ½ volume, poured into 300 ml. water and filtered to remove starting material. The filtrate was allowed to stand and the resulting solid was filtered to give a product M.P. 208–11°.

The other compounds of this invention can be made by modification of ingredients and quantities of the above example as is well understood by those skilled in the art.

From pharmacology tests run on 2-N-piperidinomethyl-3-o-tolyl-6 - sulfamyl-7-chloro-1,2,3,4-tetrahydro-4-(3H)-quinazolinone (compound N) and other indications and analogy, the compounds of this invention are effective diuretics, saluretics, and antihypertensives with low toxicity. For example, the following is a summary of the pharmacology on the above compound N:

SUMMARY (a) Symptomatology and Acute LD50 in mice:

*Orally*—LD50>1000 mg./kg. (48 hours)
*Interperitoneal*—LD50>316 mg./kg. (48 hours)

(b) Cardiovascular in dog: Doses intravenously up to 10 mg./kg. were administered. There were no changes in the cardiovascular system.

(c) Diuretic assay in rats: When administered by the oral route in initial assays measuring output of urine (ml./kg.), Na+, and Cl− (meq./kg.) at 4 hours and 21 hours after drug administration, the above compound N was found to promote water and salt loss, has a rapid onset and prolonged action, and appears to have a potency greater than that of quinethazone.

From the above and other tests applicant states that the compounds described in this specification and those coming under the generic formula are effective and safe diuretics when administered to warm-blooded animals in the same manner and amounts as for hydrochlorthiazide.

In the preceding specification the temperatures, wherever given, are in degrees centigrade.

Various modifications of the structural formula on page 1 of the specification may be made, such as, for example, has been done for other tetrahydro-7-halo-6-sulfamyl-4-quinazolinones known to the art, without departing from the spirit of the invention which is concerned particularly with the aryl and alkaryl group on the 3- position, and heterocylic or amino groups in the 2- position. $R_1$, for example, may be an aralkyl such as benzl or β phenethyl or substituted aralkyl such as ortho-chlorobenzyl, or the like, as well as hydrogen or lower alkyl.

It will also be understood that any of the groups of $R_2$ may be substituted for the 2 hydrogen of the heterocycle to form di or spiro compounds.

Likewise, therapeutically effective salts of the compounds of the invention may be made by methods known to the art, and are useful diuretics. For example, the sulfamyl group will react with bases to give sodium, potassium or ammonium salts of the quinazolinone compound. The basic nitrogen of the quinazolinone can be reacted with acids such as hydrochloric, maleic, tartaric, and the acidic ion exchange resins such as carboxylic acid, phosphonic acid, and sulfonic acid cation exchange resins to give the therapeutically effective and nontoxic salts of the quinazolinone compound.

What is claimed is:

1. A compound of the formula:

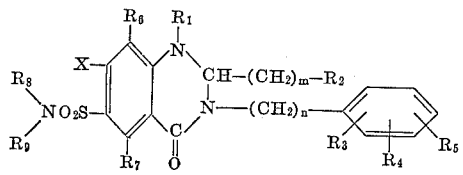

or the pharmaceutically acceptable salts thereof, wherein $R_2$ is piperidino, pyridyl, pyrrolodino, or morpholino; or $R_2$ is $NH_2$, $NHR_{10}$ where $R_{10}$ is loweralkyl, or phenylloweralkyl or $R_2$ is

where $R_{11}$ is one of the radicals of $R_{10}$; or $R_2$ is

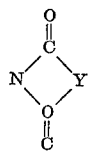

where Y is methylene, ethylene or o-phenylene optionally substituted with loweralkyl, loweralkoxy, halogen, amino or loweralkylamino;

$R_1$ is hydrogen, loweralkyl, phenylloweralkyl optionally substituted with loweralkoxy, loweralkyl or halogen;

X is halogen, loweralkoxy, halogen substituted loweralkyl, loweralkyl, $NO_2$, CN, thioloweralkyl, amino or loweralkylamino;

$R_6$ and $R_7$ are the same or different radicals of hydrogen, loweralkoxy, loweralkyl or halogen;

$R_8$ is hydrogen and $R_9$ is hydrogen, or $R_8$ is loweralkyl and $R_9$ is loweralkyl, or $R_8$ is loweralkyl or phenylloweralkyl and $R_9$ is hydrogen, or $R_8$ and $R_9$ are joined together to form piperidino, morpholino or pyrrolidino;

$R_3$, $R_4$, and $R_5$ are any of the radicals (the same or different) hydrogen, loweralkyl, hydroxy, loweralkoxy, loweralkoxyloweralkyl, amino, loweralkylamino, sulfamyl, halogen or trifluoromethyl;

$n$ is one of the integers 0–4, and $m$ is one of the integers 0–6.

2. The compound of claim 1 wherein the pharmaceutically acceptable salt is an acid addition salt.

3. The compound according to claim 1 having the structure such that the compound is 2-(N-piperidinomethyl)-3 - (o-tolyl) - 6-sulmafyl-7 - chloro-1,2,3,4 - tetrahydro-4- quinazolinone.

4. The compound according to claim 1 having the structure such that the compound is 2-(2-pyridylmethyl)-3-(o-tolyl)-6-sulfmayl-7-chloro-1,2,3,4-tetrahydro - 4 - quinazolinone.

5. The compound according to claim 1 having the structure such that the compound is 2-(N-morpholinomethyl)-3-(o - tolyl)-6 - sulfamyl-7 - chloro-1,2,3,4-tetrahydro-4-quinazolinone.

6. The compound according to claim 1 having the structure such that the compound is 2-(N-pyrrylmethyl)-3-(o-tolyl) - 6-sulfamyl - 7-chloro - 1,2,3,4-tetrahydro-4-quinazolinone.

7. The compound according to claim 1 having the structure such that the compound is 2-(N-dimethylaminomethyl) - 3-(o-tolyl) - 6-sulfamyl-7 - chloro-1,2,3,4-tetrahydro-4-quinazolinone.

8. The compound according to claim 1 having the structure such that the compound is 2-(N-benzylaminomethyl) - 3-(o-tolyl) - 6-sulfamyl-7 - chloro-1,2,3,4-tetrahydro-4-quinazolinone.

References Cited

UNITED STATES PATENTS 3,452,020   6/1969   Shetty ---------- 260—256.5

ALEX MAZEL, Primary Examiner

R. J. GALLAGHER, Assistant Examiner

U.S. Cl. X.R.

260—256.5; 424—79, 200, 248, 251